US007766679B2

(12) United States Patent
Endou et al.

(10) Patent No.: US 7,766,679 B2
(45) Date of Patent: Aug. 3, 2010

(54) PLUGGABLE MODULE AND DETACHING JIG THEREOF

(75) Inventors: Futoshi Endou, Yokohama (JP);
Hiroyoshi Ishii, Yokohama (JP);
Toshikazu Ohtake, Yokohama (JP);
Satoshi Motohiro, Yokohama (JP)

(73) Assignee: Opnext Japan, Inc., Kanagawa (JP)

( * ) Notice: Subject to any disclaimer, the term of this patent is extended or adjusted under 35 U.S.C. 154(b) by 0 days.

(21) Appl. No.: 12/010,509

(22) Filed: Jan. 25, 2008

(65) Prior Publication Data

US 2008/0188104 A1 Aug. 7, 2008

(30) Foreign Application Priority Data

Jan. 26, 2007 (JP) ............................. 2007-016363

(51) Int. Cl.
*H01R 13/62* (2006.01)
(52) U.S. Cl. ...................................... 439/160; 439/372

(58) Field of Classification Search .................. 439/152, 439/159, 160, 345, 358, 372
See application file for complete search history.

(56) References Cited

U.S. PATENT DOCUMENTS

2006/0078259 A1    4/2006    Fuchs

*Primary Examiner*—Khiem Nguyen
(74) *Attorney, Agent, or Firm*—McDermott Will & Emery LLP

(57) ABSTRACT

There is provided a pluggable module having grooves, on lateral faces, for latching with a cage and engaging portions for detachment, wherein the module body is detached from the cage by using a module detaching unit which is inserted along the grooves and which locks the engaging portions of the module body in the length direction. Further, there is provided a detaching jig including: latch release portions which are inserted between the pluggable module and the cage; lock portions which allow the pluggable module to be locked in the detaching direction; and a handle portion for detaching the pluggable module from the cage.

3 Claims, 8 Drawing Sheets

F I G. 5
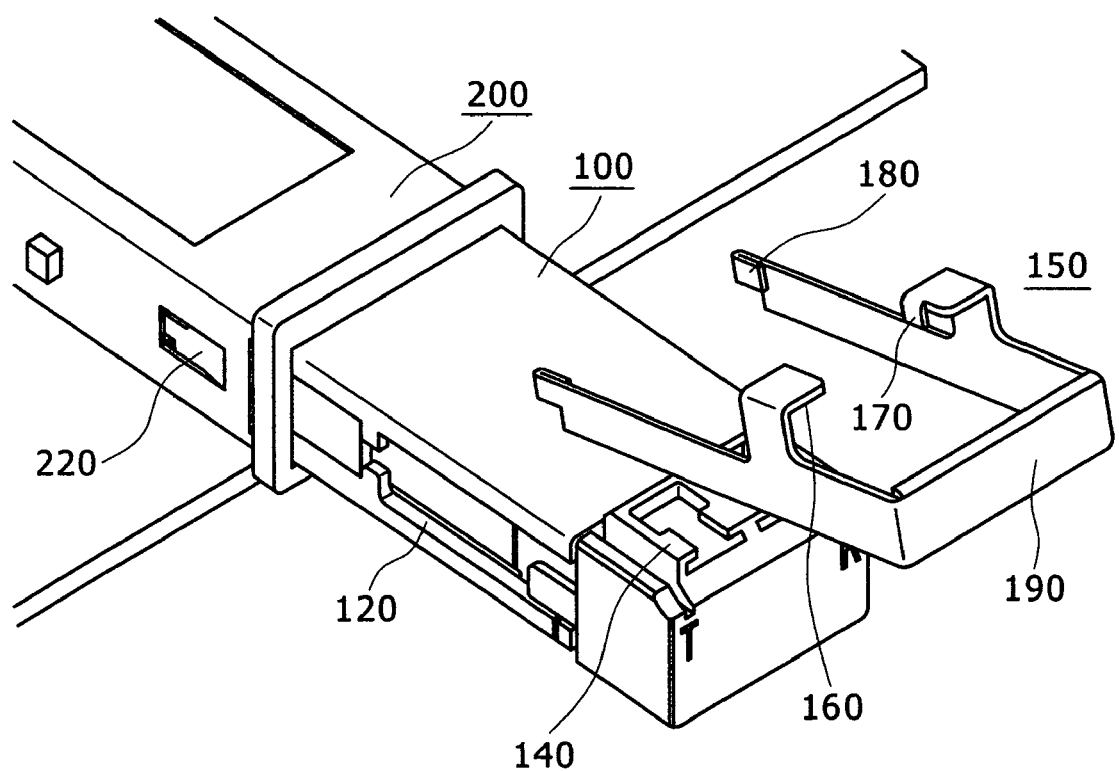

PLUGGABLE MODULE AND DETACHING JIG THEREOF

CLAIM OF PRIORITY

The present application claims priority from Japanese patent application serial no. 2007-016363, filed on Jan. 26, 2007, the content of which is hereby incorporated by reference into this application.

BACKGROUND OF THE INVENTION

The present invention relates to a pluggable module and a detaching jig thereof, and particularly to a pluggable/unpluggable module which transmits and receives information to/from the outside of an information transceiver and a detaching jig thereof.

In recent years, optical transceivers are mounted in various information processing apparatuses as a core of optical fiber data transmission techniques, and easily enable bidirectional communications of large-volume data. Among them, an optical transceiver of an optical receptacle type, such as a router and a switch, which can be directly attached and detached to/from a front panel of an apparatus and to which optical connectors can be directly connected is beginning to enter the mainstream. An optical transceiver performs bidirectional communications by using electric data signals with an information processing apparatus in which the optical transceiver is mounted. The optical transceiver performs communications with another optical transceiver while performing signal conversion between an electric data signal and an optical data signal through a laser diode, a photodetector, and peripheral circuits. End users can exchange an optical transceiver for another according to an optical transmission distance, usage, and the like.

Multisource Agreement (MSA) which standardizes an exterior and a connector of an optical transceiver in the industry has been established. MSA includes XENPAK MSA, XFP MSA, and the like. MSA standardizes specifications of electric characteristics and optical characteristics in addition to the exterior. The designs of exterior dimensions in MSA include the design of a module guide (hereinafter, referred to as a cage) and the designs of a stop mechanism and a case. The guide and the stop mechanism allows for realization of rapid exchange of a module, determination of an appropriate contact position, and securing of a contact force. In addition, these mechanisms function to prevent a module and a line card from being damaged due to rough treatment by an operator.

A designer of an optical transceiver module designs the stop mechanism in consideration of the design of a cage into which the optical transceiver module is inserted. The designs of the stop mechanism are released in various kinds, and easy plugging/unplugging and strong fixing are mainly considered. Most of pluggable/unpluggable optical transceiver modules have a hot plug protection mechanism for designs of an electric power line and a data line. However, the stop mechanism is important to prevent unexpected detachment and falling.

US Patent Application Laid-Open No. 2006/0078259A1 describes an optical transceiver module in which a stop mechanism can be released by pulling a lever mounted at a front portion by 90 degrees when attaching and detaching the optical transceiver module.

An electric transceiver module as well as an optical transceiver module can be inserted into a cage. A module to be inserted into a cage is called a pluggable module, and both of an optical transceiver module and an electric transceiver module are pluggable modules.

In the stop mechanism described in US Patent Application Laid-Open No. 2006/0078259A1, only user-friendliness of the optical transceiver module is considered, and thus some problems are involved.

In the first place, unexpected falling is conceivable. In a circumstance where such a pluggable/unpluggable optical transceiver is installed, plural similar optical transceivers are present in the vicinity. Accordingly, there is a risk that the optical transceiver falls due to some sort of fault (tangles of optical fiber cables and the like) in a mechanism where the stop mechanism can be released only by pulling the lever by 90 degrees.

In the second place, the dimension of the lever used when detaching the optical transceiver is restricted. In MSA, the size of the lever is specified, and it is difficult to detach the optical transceiver module when the optical transceivers are aligned in a vertical direction.

In the third place, a security problem is involved. In recent years, an optical fiber data transmission technique is used for consumers, skills of end users are lowered, and places and circumstances where the technique is used expand. Since the optical transceiver module described in US Patent Application Laid-Open No. 2006/0078259A1 can be easily detached, there is a risk that it can be detached out of malice. There is also a risk that it can be accidentally detached without malice. There is a possibility that easiness of detachment causes some sort of fault in the optical transceiver module or an information processing apparatus.

SUMMARY OF THE INVENTION

The present invention solves the above-described problems, and provides a pluggable module which can be detached only by a person who possesses the control authority.

The above-described object can be achieved by a pluggable module including: a module body having grooves, on lateral faces, for latching with a cage and engaging portions for detachment; and a module detaching unit, a part of which is arranged along the grooves so as to release the latching and which locks the engaging portions of the module body in the length direction.

Further, the above-described object can be achieved by a pluggable module having grooves, on lateral faces, for latching with a cage and engaging portions for detachment, wherein the module body is detached from the cage by using a module detaching unit which is inserted along the grooves and which locks the engaging portions of the module body in the length direction.

Furthermore, the above-described object can be achieved by a detaching jig including: latch release portions which are inserted between the pluggable module and the cage; lock portions which allow the pluggable module to be locked in the detaching direction; and a handle portion for detaching the pluggable module from the cage.

BRIEF DESCRIPTION OF THE DRAWINGS

Preferred embodiments of the present invention will now be described in conjunction with the accompanying drawings, in which:

FIG. 5 is a perspective view for explaining a latch release procedure by using the optical transceiver module detaching unit;

DESCRIPTION OF THE PREFERRED EMBODIMENTS

Figure 1:
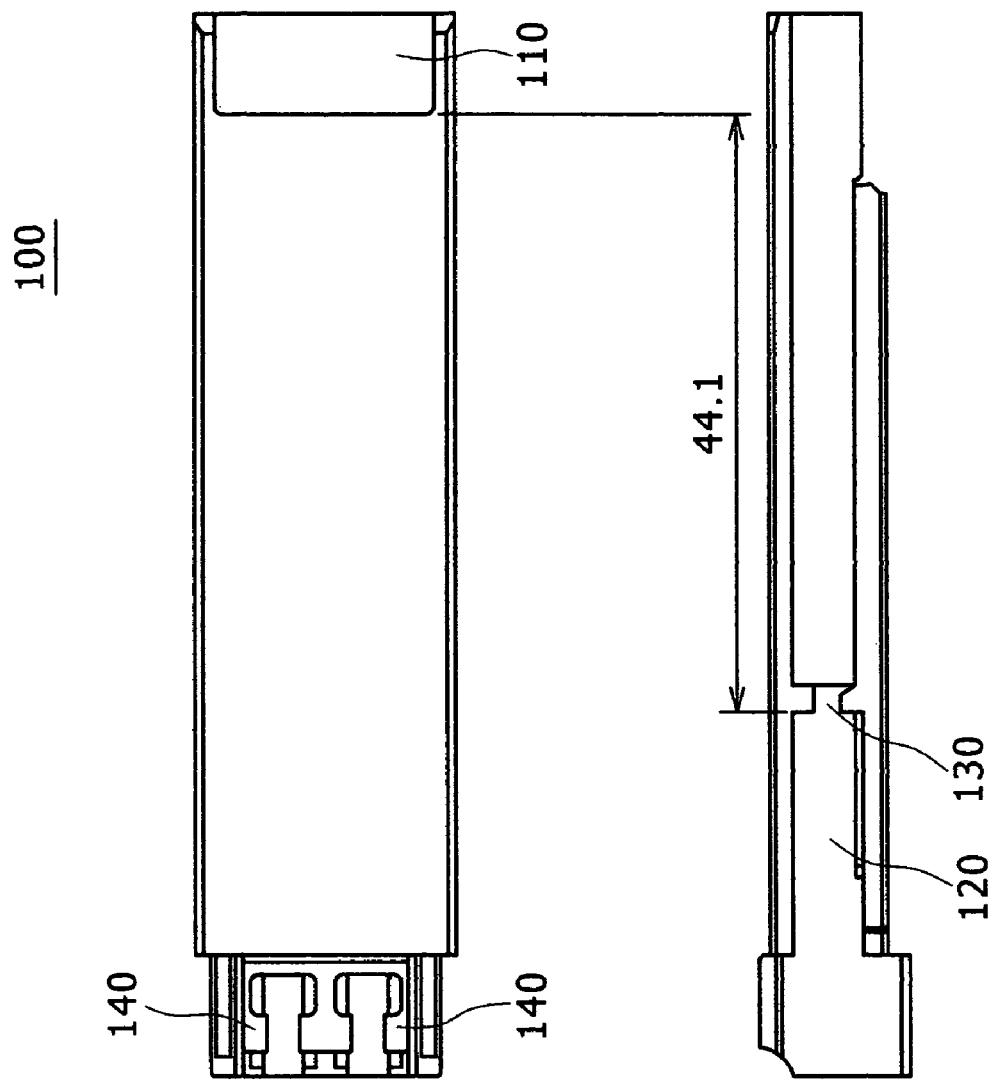
FIG. 1 is three side views of an optical transceiver module body.
Figure 2:
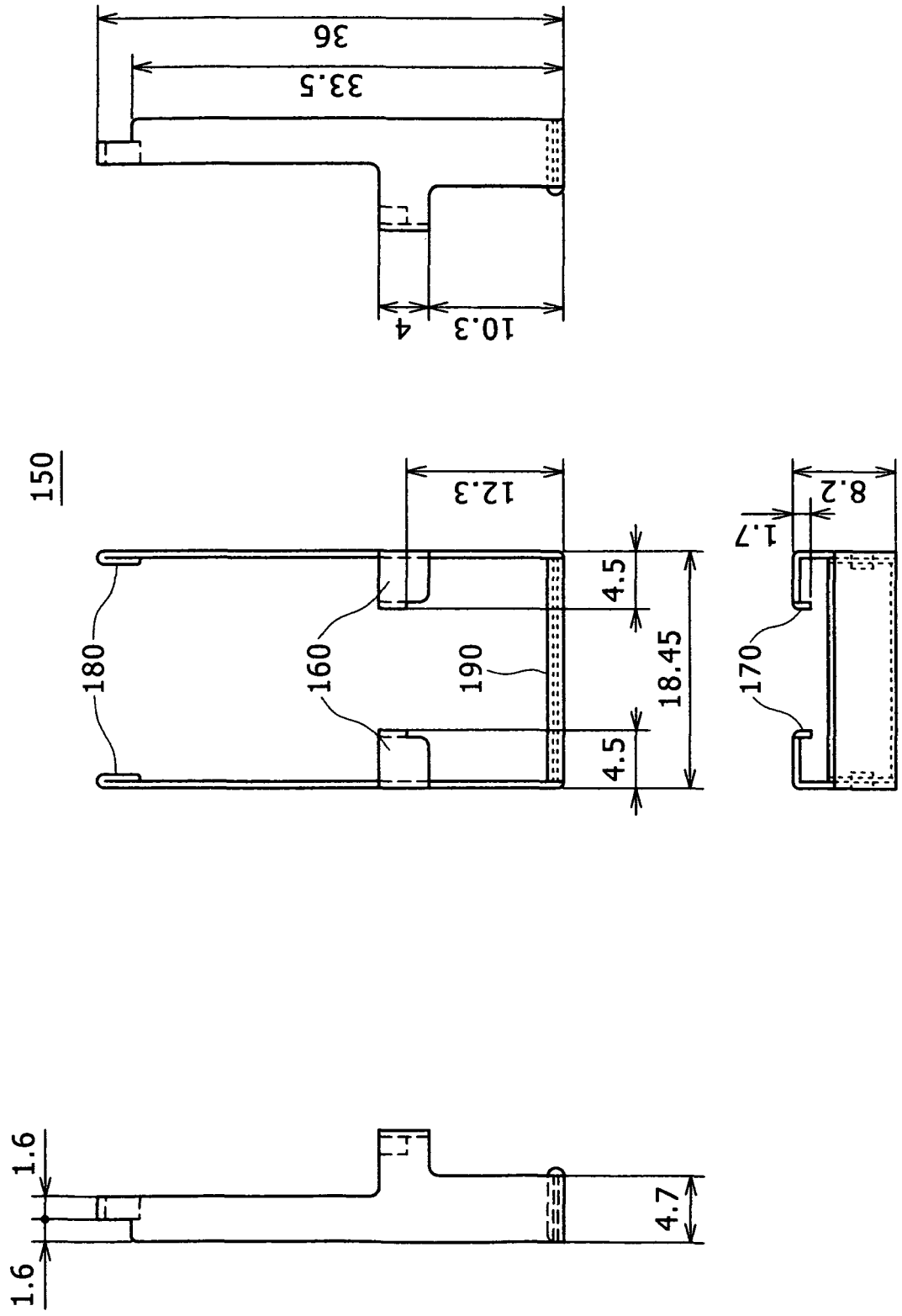
FIG. 2 is four side views of an optical transceiver module detaching unit.
Figure 3:
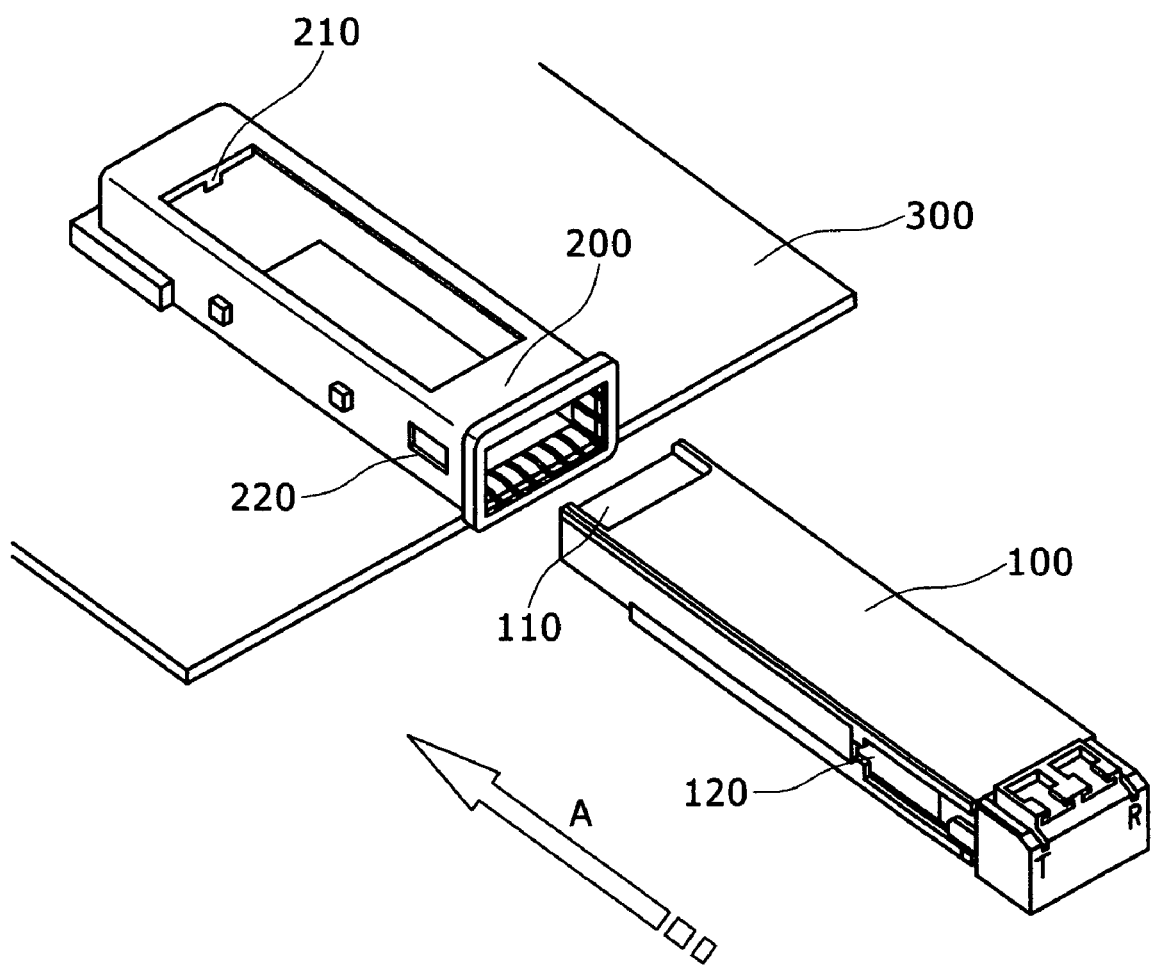
FIG. 3 is a perspective view for explaining a state in which the optical transceiver module is inserted into a cage.
Figure 4:
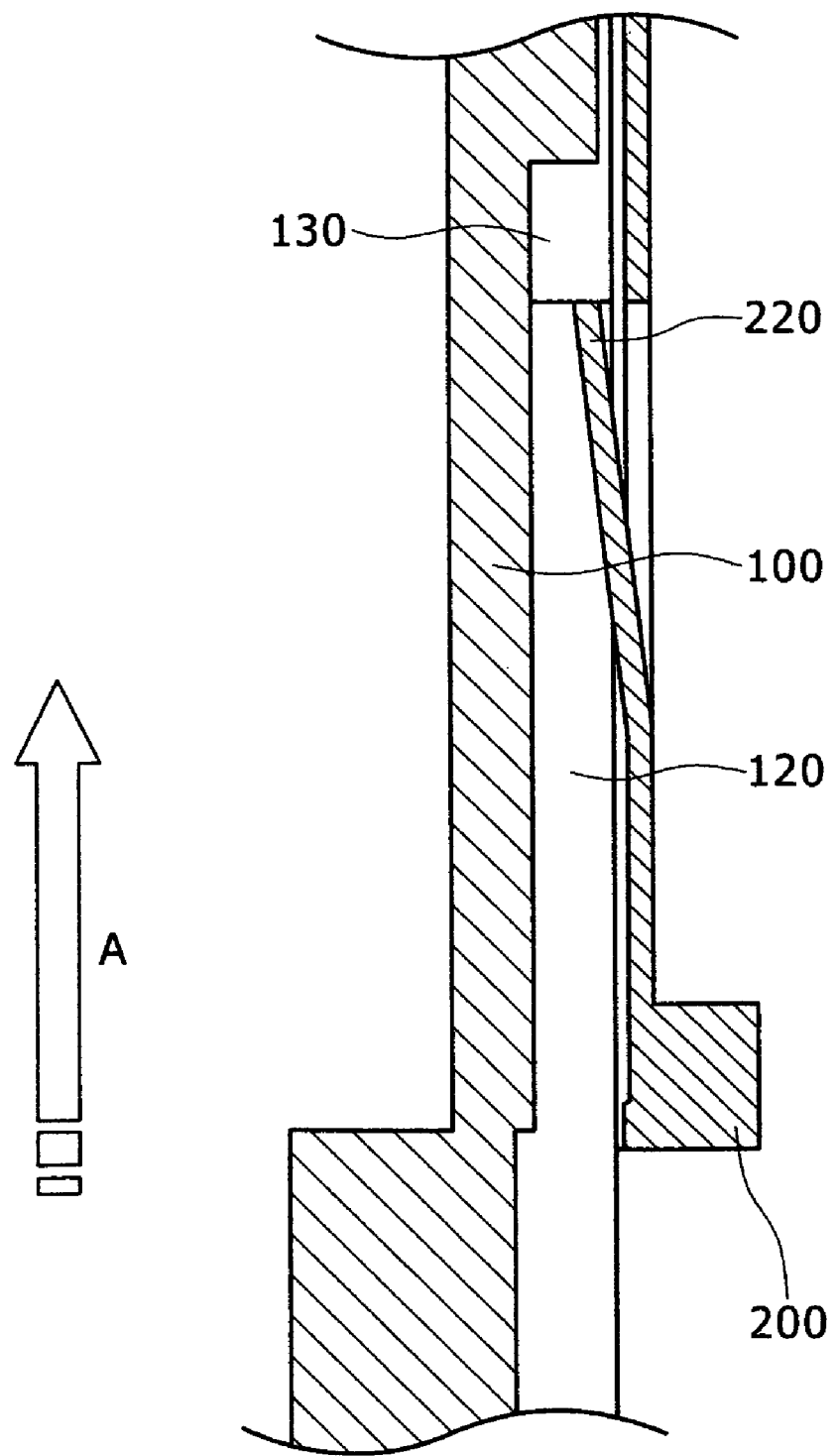
FIG. 4 is a partial cross-sectional view for explaining a latched state by a plate spring.
Figure 6:
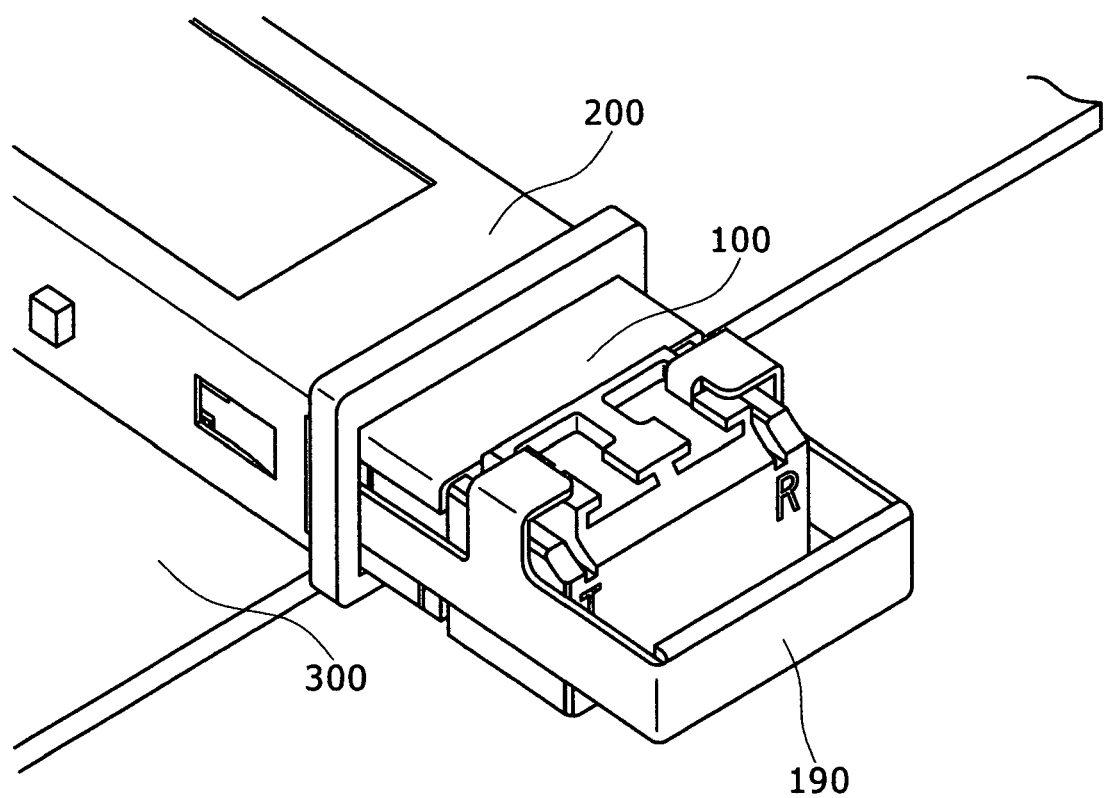
FIG. 6 is a perspective view for explaining a state in which the body is locked by using the optical transceiver module detaching unit.
Figure 7:
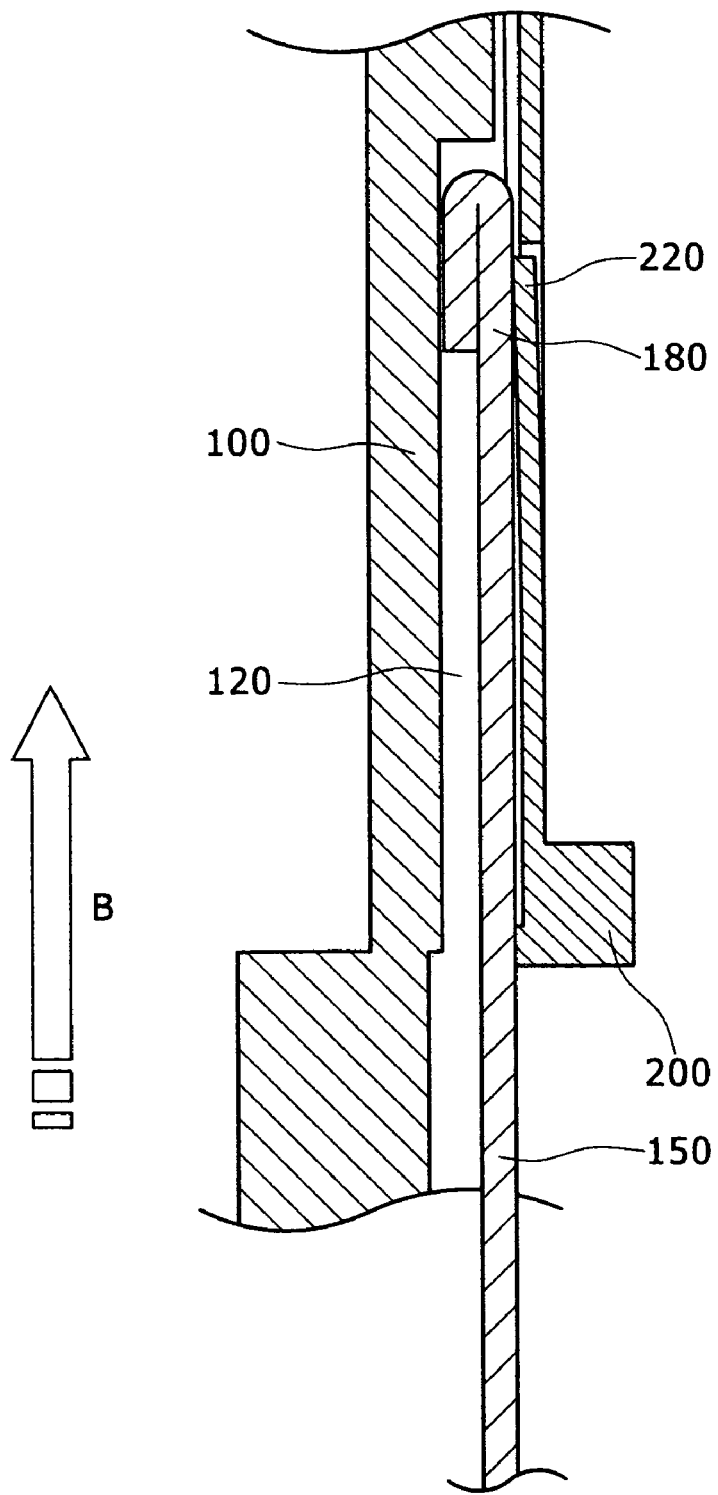
FIG. 7 is a partial cross-sectional view for explaining a latch release procedure by using the optical transceiver module detaching unit.
Figure 8:
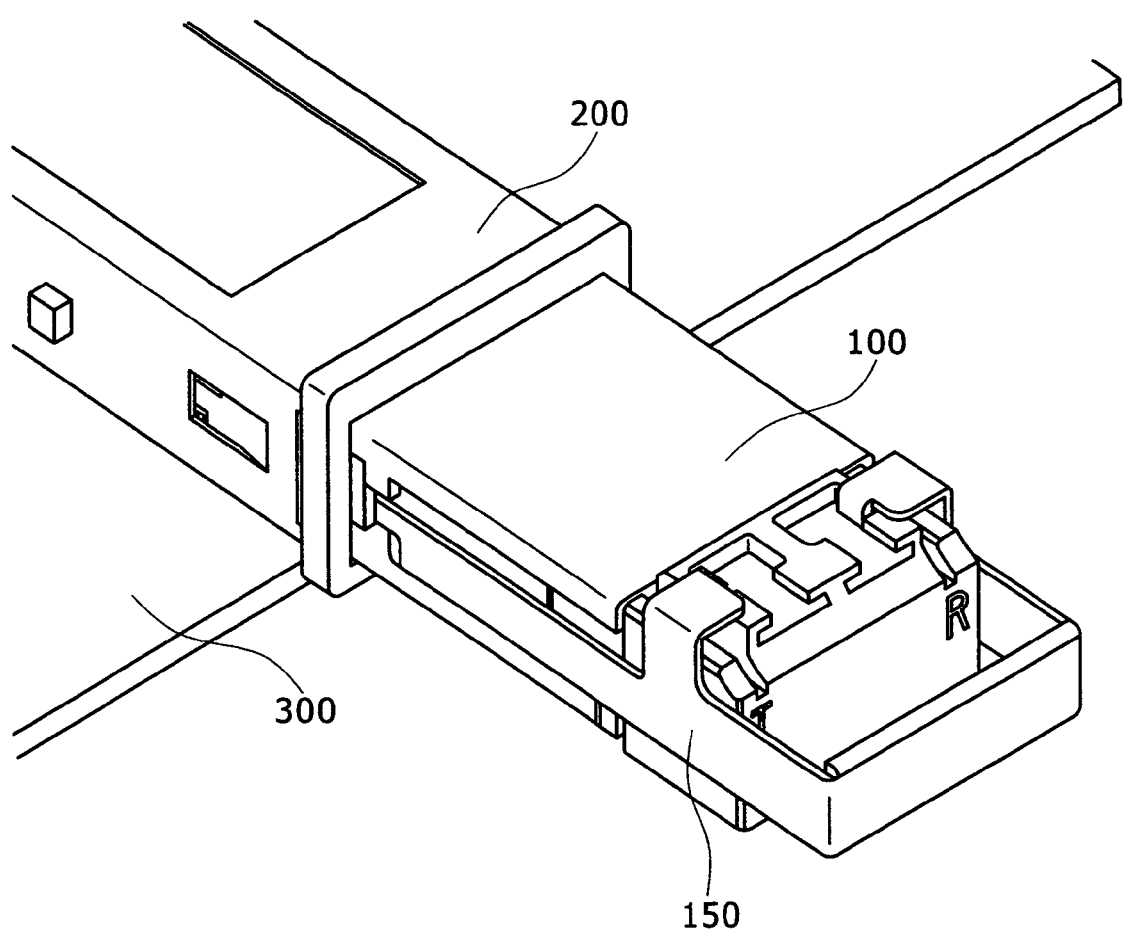
FIG. 8 is a perspective view for explaining a state in which the body is pulled out by using the optical transceiver module detaching unit.

Hereinafter, an embodiment will be described with reference to the drawings. It should be noted that like elements are given the same reference numerals, and thus the explanations thereof will not be repeated. FIG. 1 is three side views of an optical transceiver module body. FIG. 2 is four side views of an optical transceiver module detaching unit. FIG. 3 is a perspective view for explaining a state in which the optical transceiver module is inserted into a cage. FIG. 4 is a partial cross-sectional view for explaining a latched state by a plate spring. FIG. 5 is a perspective view for explaining a latch release procedure by using the optical transceiver module detaching unit. FIG. 6 is a perspective view for explaining a state in which the body is locked by using the optical transceiver module detaching unit. FIG. 7 is a partial cross-sectional view for explaining a latch release procedure by using the optical transceiver module detaching unit. FIG. 8 is a perspective view for explaining a state in which the body is pulled out by using the optical transceiver module detaching unit.

In FIG. 1, an optical transceiver module body 100 has an outer shape with about 78.0 mm in length, 8.5 mm in height and 18.35 mm in width. The length described herein denotes a direction of insertion into a cage, i.e. a length in the right-left direction of the plan view and the front view. The optical transceiver module body 100 has a cage insertion reference position at a left end of a dug portion 110 with 1.7 mm in depth, 6.9 mm in length and 16.15 mm in width, as shown at a right end of the plan view. The optical transceiver module body 100 is inserted into the cage so that the cage insertion reference position abuts on a cage-side reference position, and thus the insertion into the cage is completed. A groove 120 with at least 4.3 mm in height and 0.5 mm in depth, ranging from a position apart from the cage insertion reference position of the optical transceiver module body 100 by 44.1 mm to a left end of the optical transceiver module body 100, is formed at each of center portions of both lateral faces of the optical transceiver module body 100. A groove 130 with 2.0 mm in height, 2.0 mm in length and 0.5 mm in depth is also formed on the right side of each groove 120.

In the plan view and side view, engaging portions 140 to be engaged with an optical transceiver module detaching unit 150 are formed at two portions in the width direction in a cage-insertion part of the optical transceiver module body 100. It should be noted that the grooves 120 each with 0.5 mm in depth provided on the lateral faces of the optical transceiver module body 100 at the positions of the engaging portions penetrate at least in the upper direction. In other words, the grooves 120 each with 0.5 mm in depth provided on the lateral faces of the optical transceiver module body 100 have no difference in level in the upper direction at the positions of the engaging portions 140. However, it is not necessary that the grooves 120 each with 0.5 mm in depth provided on the lateral faces of the optical transceiver module body 100 penetrate in the upper direction. "T" means transmitter and "R" means receiver in the side view.

In FIG. 2, the optical transceiver module detaching unit 150 is formed by bending a stainless plate with 0.5 mm in thickness. In the plan view, the optical transceiver module detaching unit 150 is formed in a U-shape with a horizontal bottom. The stainless plate is bent by 180 degrees at the both ends and the bottom of the U-shape. A wing 160 is formed inside the U-shape at each intermediate portion of the U-shape, and a fin 170 directing downward is formed at each tip end of the both wings 160. The bottom width of the optical transceiver module detaching unit 150 is as large as 18.45 mm, and each wing 160 with 4.5 mm in width and 4.0 mm in length is located at a position apart from the bottom by 12.3 mm and at 8.2 mm in height. In addition, each fin 170 with 1.7 mm in height and 2.0 mm in length is provided at each tip end of the wings 160.

In the side view, the height and length of the U-shape portion are as large as 3.2 mm and 36 mm, respectively, and steps are formed at tip ends 180. The height and length of each step are as large as 1.6 mm and 2.5 mm, respectively, and the step portions are bent. The height of the bottom of the U-shape is as large as 4.7 mm. The step portions serve as latch release portions 180.

In FIG. 3, a cage 200 is attached on a host substrate 300, and the optical transceiver module body 100 is inserted into a slot of the cage 200 from the direction indicated by the arrow A. A stopper 210 is provided at an end (the cage-side reference position) of an upper opening of the cage 200. In addition, plate springs 220 that are open toward the length direction are attached to lateral faces of the cage 200 on the inner sides. The plate springs 220 fall into the grooves 120 on the lateral faces of the optical transceiver module body 100 immediately before the optical transceiver module body 100 abuts on the stopper 210 at the cage insertion reference position, so as to latch the optical transceiver module body 100.

With reference to FIG. 4, latching will be explained. FIG. 4 is a partial cross-sectional view of right faces of the cage and the optical transceiver module body that is latched with the cage. When the optical transceiver module body 100 is inserted into the cage 200, the both plate springs 220 of the cage 200 are pushed and spread wide by the optical transceiver module body 100. However, the both plate springs 220 of the cage 200 reach the grooves 120 so as to return to the original positions, and latch the optical transceiver module body 100.

With reference to FIG. 5, detaching of the optical transceiver module body from the cage will be explained. It should be noted that the optical transceiver module body 100 is detached from a state in which the optical transceiver module body 100 is inserted into the cage 200. However, for easy understanding, FIG. 5 shows a state in which the optical transceiver module body 100 is partially pulled out from the cage 200.

In FIG. 5, the optical transceiver module detaching unit 150 is inserted into spaces formed between the lateral faces of the optical transceiver module body 100 latched with the cage 200 and the cage 200. It should be noted that the spaces formed between the lateral faces of the optical transceiver module body 100 and the cage 200 are formed by tolerance and the grooves of the optical transceiver module body 100. At this time, the optical transceiver module detaching unit 150 is inserted into the spaces by slightly lifting the bottom of the U-shape (hereinafter, referred to as a handle 190) and by allowing the vicinities of the both ends to slide along lower portions of the grooves.

In FIG. 6, when the insertion of the optical transceiver module detaching unit 150 into the spaces between the lateral faces of the optical transceiver module body 100 and the cage 200 is completed, the handle 190 is allowed to return to the horizontal position. By allowing the handle 190 to return to the horizontal position, the engaging portions 140 of the optical transceiver module body 100 and the fins 170 of the optical transceiver module detaching unit 150 are locked with each other in the length direction.

In FIG. 7, in a state where the insertion of the optical transceiver module detaching unit 150 is completed, the both plate springs 220 of the cage 200 are pushed by the optical transceiver module detaching unit 150 so as to be returned from the grooves, and the latching is released.

In FIG. 8, the latching between the optical transceiver module body 100 to which the optical transceiver module detaching unit 150 is inserted and the cage 200 is released, and the optical transceiver module body 100 is locked with the optical transceiver module detaching unit 150 in the length direction. Accordingly, the optical transceiver module body 100 can be easily pulled out from the cage 200 by pulling the handle 190.

In the above description, the optical transceiver module is used. However, an electric transceiver module may be used. The engaging portions of the optical transceiver module body is provided on an upper face, but may be provided on a lower face or lateral faces.

According to the embodiment, there can be provided a pluggable module which can be detached only by a person who possesses a detaching jig.

What is claimed is:

1. A pluggable module having grooves, on lateral faces, for latching with a cage and engaging portions for detachment, and detaching from the cage via a detaching jig, wherein the detaching jig is separable from the pluggable module, wherein the pluggable module is detached from the cage by using the detaching jig which is inserted along the grooves in a reverse direction of the detaching direction and locks with the engaging portions of the pluggable module in the detaching direction.

2. The pluggable module according to claim 1, wherein said engaging portions are provided on a face intersecting with the lateral faces.

3. The pluggable module according to claim 1, wherein said module body is an optical transceiver module.

\* \* \* \* \*